United States Patent [19]

Borza et al.

[11] 4,406,778

[45] Sep. 27, 1983

[54] SPENT OIL RECOVERY PROCESS

[75] Inventors: Michele Borza, Cremona; Sergio Leoncini, S.Donato Milanese; Aldo Modenesi, Fiorenzuola D'Arda, all of Italy

[73] Assignee: Snamprogetti S.p.A., Milan, Italy

[21] Appl. No.: 387,611

[22] Filed: Jun. 11, 1982

[30] Foreign Application Priority Data

Jul. 7, 1981 [IT] Italy ................ 22778 A/81

[51] Int. Cl.$^3$ ............................................ C10M 11/00
[52] U.S. Cl. ................................... 208/179; 208/185
[58] Field of Search ..................... 208/184, 179, 185

[56] References Cited

U.S. PATENT DOCUMENTS

| | | | |
|---|---|---|---|
| 1,898,168 | 2/1933 | Belden | 208/185 |
| 3,919,076 | 11/1975 | Cutler et al. | 208/179 |
| 4,233,140 | 11/1980 | Antonelli et al. | 208/184 |

FOREIGN PATENT DOCUMENTS 50-102602  8/1975  Japan ..................... 208/185

OTHER PUBLICATIONS

Hydrocarbon Process., 4/74 "Re-refining Uses Propane Treatment", pp. 129–131.

*Primary Examiner*—Delbert E. Gantz
*Assistant Examiner*—Helane E. Maull
*Attorney, Agent, or Firm*—Hedman, Casella, Gibson, Costigan & Hoare

[57] ABSTRACT

A process for reclaiming spent oil comprises the steps of removing water and light hydrocarbons, thermally treating the stripped oil, extracting it with a supercritical gas to insolubilize impurities and additives, separating the gas-rich fractions from the oil-depleted gas fractions, expanding the insoluble fractions, separating the additives and impurities, separating the various hydrocarbon fractions according to the respective viscosities, compressing and recycling the gas phases and withdrawing the residue and the oil fractions according to the respective viscosities.

10 Claims, 1 Drawing Figure

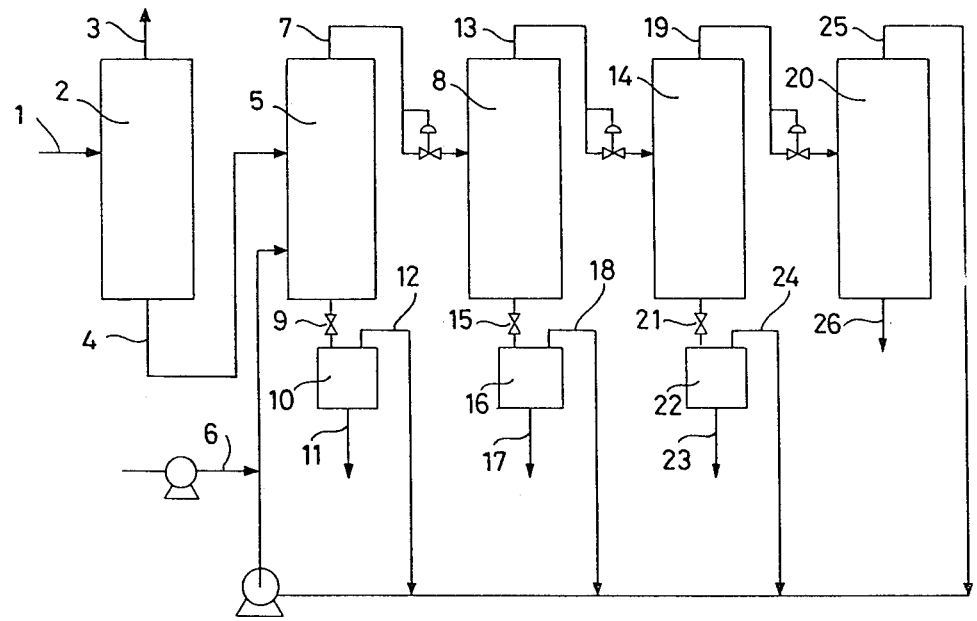

SPENT OIL RECOVERY PROCESS

This invention relates to a spent oil recovery process. More specifically, the invention relates to a process for recovering a spent oil by extraction with a gas in a supercritical state under determined operating conditions, to separate the oil from the impurities and from the additives contained in it.

Some known methods for recovering a spent oil are described hereinafter.

One of these methods consists of feeding the spent oil to an extraction column into which liquefied propane is also fed. The oil dissolved in the propane is withdrawn from the top of the column, and the insoluble residue is removed from the bottom of the column.

The mixture containing oil and propane is fed to a two-stage evaporation apparatus in which the oil is separated from the propane, while the residue after recovering the contained propane is burnt with the naphtha.

The propane recovered both from the residue and from the mixture is compressed and recycled to the extraction column, and the oil is fed to a refining process using sulphuric acid. This final treatment requires a considerable quantity of sulphuric acid, and also forms certain quantities of undesirable residual products.

A further method is described in Belgian Pat. No. 880,074 of KRUP in which the spent oil is fed to an extraction column with a gas which is above its critical pressure and temperature.

This process obviates some of the drawbacks encountered in the preceding method, but a purified oil is obtained which also contains additives which can only be subsequently separated with great difficulty.

A spent oil recovery process has now been surprisingly found by which the aforesaid drawbacks are obviated, thus attaining obvious technical and economical advantages.

The process of the present invention comprises the following stages:
 (a) feeding the spent oil to a predistillation column in order to remove the water and light hydrocarbons from the top of the column;
 (b) subjecting the spent oil to thermal treatment;
 (c) feeding the predistilled and thermally treated spent oil to an extraction column into which a gas under supercritical conditions is separately fed, in order to dissolve most of the hydrocarbon fraction and leave undissolved the impurities and additives contained in the oil;
 (d) feeding the dissolved hydrocarbon fraction of point (c) into one or a series of separation columns to separate one or more gas-rich oil fractions from the corresponding oildepleted gas equilbrium fractions;
 (e) expanding to the same pressure in separation stages both the undissolved product of point (c), thus separating the residue containing hydrocarbons, additives and impurities from the gas used for the extraction, and the gas-rich oil fraction or fractions of point (d), with the exception of that of the single separation column or the last column in the series of separation columns, thus separating hydrocarbon fractions of different viscosities from the gas;
 (f) compressing and recycling to the extraction column the gas recovered under point (e) and that withdrawn as overhead product from the last separation column;
 (g) withdrawing the residue and the oil at different viscosities from the separation stages of point (e) and from the bottom of the single separation column or from the last column in the series of separation columns.

The extraction of a spent oil with a gas in a supercritical state, using thermal treatment and determined operating conditions, enables the oil to be separated from the impurities and additives contained therein.

As stated heretofore, the process according to the Krupp patent provides an oil containing additives which are difficult to eliminate, whereas in our process the aforesaid drawback is obviated because besides using a gas under supercritical conditions, said thermal treatment upstream of the extraction favours the non-dissolving of the additives in the next stage of the process.

This thermal treatment can be carried out either upstream of the predistillation column or in the column itself by increasing the operating temperature, or again downstream before feeding the spent oil to the first extraction column. The temperature of the thermal treatment can be chosen between 200° C. and 420° C. and the residence time can vary from one minute to two hours, said ranges being dictated by the type of oil to be recovered and by the particular additives and impurities present.

Hydrocarbons containing from 2 to 5 carbon atoms or carbon dioxide can be used as the process gas. The use of propane is recommended in particular. The temperature and pressure of the extraction column are chosen to give best separation of the oil both from the impurities and from the additives, as it would be difficult to obtain separation of the additives from the oil if the solubility conditions of the supercritical gas were such as to also dissolve the additives.

The temperatures used in the extraction column and in the separation columns lie between the critical temperature of the gas used and a temperature which is 100° C. greater than the critical temperature, and the pressures exceed the critical pressure.

The extraction column can operate either co-currently or counter-currently.

In addition, while keeping within the aforesaid limits, such separation column operates at a temperature greater than and/or at a pressure less than the preceding column. This process is suitable both for continuous and batch operations.

It should also be noted that oil with better purity characteristics is obtained if the oil yield in the overheads from the extraction column is reduced by suitable operating conditions, for example to around 80% by weight.

The invention is described in detail hereinafter with reference to the non-limiting embodiment shown as a flow diagram on the accompanying FIGURE.

The spent oil feed 1 is firstly subjected to predistillation in the predistillation column 2 in order to remove the water and light hydrocarbons 3 from the top of the column, while the spent oil leaves from the bottom 4.

Thermal treatment, not shown on the FIGURE, is then carried out either upstream of, downstream of or in said predistillation column, in order to favour the dissolving of the additives in the next stage of the process.

After thermal treatment, the spent oil is fed to the extraction column 5 in which it is extracted with a gas fed separately under supercritical conditions 6.

The oil dissolved in the gas used for the extraction 7 leaves the top of the extraction column 5 in the fluid phase, and this stream is fed to a separation column 8 operating at a higher temperature and/or lower pressure than the extraction column.

The hydrocarbon fraction, undissolved impurities and additives and part of the process gas entrained by these is withdrawn from the bottom of column 5, and this stream is expanded through a valve 9 and fed to a stage 10 in which the hydrocarbons, impurities and additives (i.e. the residue) 11 are separated from the extraction gas 12, which is recycled.

A fluid phase 13 containing oil dissolved in the gas leaves as the overhead product from the separation column 8 and is fed to a second separation column 14 operating at a higher temperature and/or lower pressure than the preceding, and the bottom stream from the column is withdrawn and expanded through a valve 15 and separated in a stage 16 into a heavy oil 17 and the extraction gas 18 which is recycled.

The overhead product from the second column 14 is a stream 19 containing hydrocarbons dissolved in the gas, and is fed to the third separation 20 operating at a higher temperature and/or lower pressure than the preceding, the bottom stream from this being withdrawn and expanded through a valve 21 and separated in a stage 22 into a medium oil 23 and the extraction gas 24 which is recycled.

A stream 25 essentially containing the process gas leaves as overhead product from the third column 20 and is recycled, whereas a bottom stream 26 is withdrawn essentially containing light oil.

The expansions are carried out so as to obtain the same final pressure in all stages so as to be able to use a single compressor for compressing the streams 12, 18, 24 and the stream 25 which is also adjusted to the same pressure, these streams being recycled to the extraction column after compression.

Part of the compressed gas could if required be fed to the bottom of the separation column to obtain better separation, Another possibility would be to heat the stages 10, 16 and 22 to give better separation of the extraction gas from the residue or oil present.

Finally, a further possibility would be to increase the temperature of the top of the extraction column and/or separation column with respect to the rest of the column in order to provide internal reflux. Two non-limiting examples are described hereinafter for the purpose of illustrating the invention.

EXAMPLE 1

A spent oil thermally treated at 230° C. for 215 seconds and predistilled in continuously extracted with propane under supercritical conditions in an extraction column maintained at a temperature of 140° C. and a pressure of 120 Kg/cm$^2$. The propane/oil ratio used, calculated in terms of liquid volumes at 15° C., is 10/1.

The fluid phase withdrawn as column overhead product is flashed at atmospheric pressure to give an oil having the characteristics given in the following table.

TABLE

| | Spent oil feed thermally treated at 230° C. for 215 sec. and predistilled | Oil extracted with propane under supercritical conditions |
|---|---|---|
| Yield % by weight | 100 | 92 |
| Viscosity 210° F. cst | 13.2 | 9.8 |
| Metals (X-ray fluorescence) | | |
| Ba ppm | 400 | <5 |
| Ca ppm | 1800 | 13 |
| Pb ppm | 2350 | 185 |
| Zn ppm | 900 | 75 |
| P ppm | 720 | 350 |
| Cl ppm | 800 | 120 |
| Br ppm | 500 | 30 |

If the fluid phase withdrawn as column overhead product is instead fed directly to a separation column, under the operating conditions used, i.e. a temperature of 140° C. and pressure of 112 kg/cm$^2$, the heaviest oil fraction is insoluble so that the oil is fractionated into two cuts of different viscosities.

The yields and characteristics of the products obtained in this manner are given in the following table.

TABLE

| | Overhead | Bottom |
|---|---|---|
| Yield % by weight | 80 | 20 |
| Viscosity 210° F. cst | 8.0 | 30.5 |
| Colour ASTM D1500 | 6 | >8 |
| Metals (X-ray fluorescence) | | |
| Ba ppm | <5 | <5 |
| Ca ppm | <5 | 68 |
| Pb ppm | 170 | 215 |
| Zn ppm | 20 | 265 |
| P ppm | 300 | 560 |
| Cl ppm | 100 | 125 |
| Br ppm | 18 | 65 |

The heavy bottom and overhead oil, this latter being a mixture of medium oil and light oil, are stripped with steam and treated with decolorising earth using known methods, to give products having the characteristics given in the following table.

TABLE

| | Medium base + light base | Heavy base |
|---|---|---|
| Density at 15° C. g/cc | 0.872 | 0.899 |
| Viscosity 100° F. cst | 56.52 | — |
| Viscosity 210° F. cst | — | 29.55 |
| Colour ASTM D1500 | <2 | 6 |
| IP 48 oxidation test: carbon residue increase | | |
| Ramsbottom % by weight | 0.28 | 0.70 |
| Viscosity ratio | 1.29 | 1.33 |
| Metals (X-ray fluorescence) | | |
| Ba ppm | <5 | <5 |
| Ca ppm | <5 | <5 |
| Pb ppm | <5 | <5 |
| Zm ppm | <5 | <5 |
| P ppm | <40 | <40 |
| Cl ppm | 50 | 40 |
| Br ppm | <5 | <5 |

EXAMPLE 2

A spent oil thermally treated at 350° C. for 215 seconds and predistilled is extracted continuously with propane under supercritical conditions with the same apparatus as in Example 1, at a temperature of 140° C.

and a pressure of 120 kg/cm², using a propane/oil ratio of 10:1 calculated in terms of liquid volumes at 15° C.

After flashing at atmospheric pressure, the fluid phase withdrawn as column overhead product releases an oil having the characteristics given in the following table.

TABLE

| | Spent oil feed thermally treated at 350° C. for 215 sec. and predistilled | Oil extracted with propane under supercritical conditions |
|---|---|---|
| Yield % by weight | 100 | 93 |
| Viscosity 210° F. cst | 13.2 | 9.9 |
| Metals (X-ray fluorescence) | | |
| Ba ppm | 420 | <5 |
| Ca ppm | 1500 | 10 |
| Pb ppm | 2350 | <5 |
| Zn ppm | 770 | <5 |
| P ppm | 980 | <40 |
| Cl ppm | 250 | 60 |
| Br ppm | 320 | 30 |

We claim:

1. A spent oil recovery process comprising
   (a) feeding the spent oil to a predistillation column in order to remove the water and light hydrocarbons from the top of the column;
   (b) subjecting the spent oil to thermal treatment;
   (c) feeding the predistilled and thermally treated spent oil to an extraction column into which a gas under supercritical conditions is separately fed, in order to dissolve most of the hydrocarbon fraction and leave undissolved the impurities and additives contained in the oil;
   (d) feeding the dissolved hydrocarbon fraction of (c) into one or a series of separation columns to separate one or more gas-rich oil fractions from the corresponding oildepleted gas equilibrium fractions;
   (e) expanding to the same pressure in separation stages both the undissolved product of (c), thus separating the residue containing hydrocarbons, additives and impurities from the gas used for the extraction, and also the gas-rich oil fraction or fractions of (d), with the exception of that of the single separation column or of the last column in the series of separation columns, thus separating hydrocarbon fractions of different viscosities;
   (f) compressing and recycling to the extraction column the gas recovered under (e) and that withdrawn as overhead product from the last separation column;
   (g) withdrawing the residue and oil at different viscosities from the separation stages of (e) and from the bottom of the single separation column or from the last column of the series of separation columns.

2. A process as claimed in claim 1, characterised in that the extraction and separation columns operate at temperatures between the critical temperature of the gas used and a temperature which is 100° C. greater than the critical temperature, and at pressure exceeding the critical pressure of said gas, and further characterised in that each of the separation columns operates at a higher temperature and/or at a lower pressure than the preceding column, but always within the aforesaid limits.

3. A process as claimed in claim 1, characterised in that the gas used for the extraction is chosen from hydrocarbons containing from 2 to 5 carbon atoms.

4. A process as claimed in claim 1, characterised in that the gas used for the extraction is carbon dioxide.

5. A process as claimed in claim 1, characterised in that the gas used for the extraction is propane.

6. A process as claimed in claim 1, characterised in that the thermal treatment is carried out either upstream of, downstream of or simultaneously with the predistillation operation.

7. A process as claimed in claim 1, characterised in that the thermal treatment is carried out at a temperature of between 200° C. and 420° C. and for a residence time of between one minute and two hours.

8. A process as claimed in claim 1, characterised in that the separation of the residue and oil fractions from the gas used for extraction is also carried out with the aid of heating.

9. A process as claimed in claim 1, characterised in that part of the recovered and compressed gas is fed to the bottom of the separation column or columns.

10. A process as claimed in claim 1, characterised in that the temperature of the top of the extraction column and/or separation column or columns is increased relative to the rest of the column, in order to obtain internal reflux.

* * * * *